United States Patent [19]
Culliss

[11] Patent Number: 6,014,665
[45] Date of Patent: Jan. 11, 2000

[54] METHOD FOR ORGANIZING INFORMATION

[76] Inventor: Gary Culliss, 9737 Larsen St., Overland Park, Kans. 66214

[21] Appl. No.: 08/960,140

[22] Filed: Oct. 29, 1997

Related U.S. Application Data

[63] Continuation-in-part of application No. 08/904,795, Aug. 1, 1997.

[51] Int. Cl.[7] .................................................... G06F 17/30
[52] U.S. Cl. ................................................................ 707/5
[58] Field of Search .................................................... 707/5

[56] References Cited

U.S. PATENT DOCUMENTS

| | | | |
|---|---|---|---|
| 5,278,980 | 1/1994 | Pedersen et al. | 707/4 |
| 5,321,833 | 6/1994 | Chzng et al. | 707/5 |
| 5,535,382 | 7/1996 | Ogawa | 707/5 |
| 5,754,939 | 5/1998 | Herz et al. | 455/4.2 |
| 5,835,087 | 11/1998 | Herz et al. | 345/327 |
| 5,907,836 | 5/1999 | Sumita et al. | 707/2 |

OTHER PUBLICATIONS

Savoy, J., "A new problalistic scheme for information retrieval in hypertext" New review of Hypermedia and Multimedia, vol. 1, PP. 107–134, 1995.

Fuhr, N. Probalistic learning approaches for indexing and retrieval with the TREC–2 collection, Sep. 1993.

Kimoto et al. "A Dynamic Thesaurus and Its Application to Associated Intormation Retrival" IJCNN–91–Seattle, vol. 1, pp.19–29, Jul. 1991.

Bidmead, C. "Windows Personal Librarian" Which Computer?, vol. 16, No. 10, pp. 23, Oct. 1993.

*Primary Examiner*—Jack M. Choules
*Attorney, Agent, or Firm*—Gary Culliss

[57] ABSTRACT

A method of organizing information in which the search activity of users is monitored and such activity is used to suggest additional key terms for addition to a search query. The invention operates by assigning scores to key term groupings in an index. As users enter search queries of two or more key terms, the scores are altered. The scores are then used in subsequent searches to suggest other key terms which can be added to the search query to narrow the search. As millions of people use the Internet and type in millions of search queries, the invention learns which key terms should be suggested for addition to a search query through an evolutionary process.

28 Claims, 1 Drawing Sheet

FIGURE 1

METHOD FOR ORGANIZING INFORMATION

RELATED APPLICATION

This patent application is a continuation-in-part of co-pending patent application, Ser. No. 08/904,795, filed Aug. 1, 1997, also entitled "Method for Organizing Information."

BACKGROUND OF THE INVENTION

1. Related Disclosures

This patent application contains subject matter disclosed in Disclosure Document Numbers 411,887; 417,369 and 417,458.

2. Field of the Invention

The present invention relates to search engines, and more particularly pertains to a method for organizing information by monitoring the search activity of users.

3. Description of the Prior Art

The Internet is an extensive network of computer systems which allows a user to connect with various computer servers or systems. The Internet permits users to send and receive data between computers connected to this network. This data may include web sites, home pages, databases, text collections, audio, video or any other type of information made available over the Internet (collectively referred to as "articles") from a computer server connected to the Internet. The articles may also include key terms representing selected portions of the information contained in the article. These key terms are available over the Internet to other computers and permit these other computers to locate the article.

To locate articles on the Internet, a user of a remote cc-outer searches for the key terms using a search program known as a search engine. Examples of search engines currently available on the Internet include "Yahoo!" (TM), "Excite" (TM), and "Alta Vista" (TM). These programs allow the remote user to type in one or more search terms, typically as a combination of English words. The search terms may be connected by Boolean logic operators or may be truncated and combined with wild card terms to form a search query. The search engine then compares the search query with the key terms from the articles and retrieves at least a portion of the articles having key terms which match the search query. The search engine will then display to the user the portion of the article such as the title. The user can then scroll through these retrieved portions of the articles and select a desired article.

Conventional key word searching and various prior art methods of accomplishing such key word searching are disclosed in at least the following patents:

| U.S. Pat. No. | Title |
| --- | --- |
| 5,588,060 | METHOD AND APPARATUS FOR A KEY-MANAGEMENT SCHEME FOR INTERNET PROTOCOLS; |
| 5,546,390 | METHOD AND APPARATUS FOR RADIX DECISION PACKET PROCESSING; |
| 5,528,757 | ROUTING SYSTEM FOR RETRIEVING REQUESTED PROGRAM BY DISCARDING RECEIVED PROGRAM IDENTICAL WITH STORED PROGRAMS AND TRANSFERRING THE RECEIVED PROGRAM NOT IDENTICAL WITH STORED PROGRAMS; |
| 5,377,355 | METHOD AND APPARATUS FOR AUTOMATED PROCEDURE INITIATION IN A DATA PROCESSING SYSTEM INCLUDING SOLICITING AN EVALUATION VOTE FROM USERS AUTOMATICALLY DETERMINED IN RESPONSE TO IDENTIFICATION OF A FUNCTIONAL AREA ASSOCIATED WITH A DOCUMENT; |
| 5,404,507 | APPARATUS AND METHOD FOR FINDING RECORDS IN A DATABASE BY FORMULATING A QUERY USING EQUIVALENT TERMS WHICH CORRESPOND TO TERMS IN THE INPUT QUERY; |
| 5,408,586 | HISTORICAL DATABASE TRAINING METHOD FOR NEURAL NETWORKS; |
| 5,408,655 | USER INTERFACE SYSTEM AND METHOD FOR TRAVERSING A DATABASE; |
| 5,371,676 | APPARATUS AND METHOD FOR DETERMINING DATA OF COMPOUND WORDS; |
| 5,185,888 | METHOD AND APPARATUS FOR DATA MERGING/SORTING AND SEARCHING USING A PLURALITY OF BIT-SLICED PROCESSING UNITS; |
| 4,967,341 | METHOD AND APPARATUS FOR PROCESSING DATA BASE; |

A person who places an article on the Internet typically intends for it to be available to all people who type in search terms that are even remotely related to the subject matter of the article. This increases the exposure of the article to the public searching the Internet. Such increased exposure can potentially increase product sales or advertising revenue for the owner of the article, especially if advertising revenue is related to the number of visits to the article or web site. Thus, there is an incentive to use as many search terms as are possibly related to the article. In fact, some articles or search engines use every word in the article as key terms. As a result, search engines will retrieve many articles which are unrelated to the subject matter which the user desires to find through a combination of search terms.

Further, some Internet users are not skilled in selecting and connecting key word search queries. These users will often type in a single word or two words connected by an "AND" opeator. These searches are extremely broad and often retrieve thousands of articles which the user must manually search through by examining the title or other brief information about each article to find the desired information or advertisement.

As the total number of articles posted on the Internet continues to increase, there is an increasing number of articles retrieved with each search query. To find an article, the user must manually search through the retrieved articles and/or repeatedly modify the search query.

OBJECTS AND SUMMARY OF THE INVENTION

Accordingly, it is an object of the invention to organize articles available on the Internet.

It is another object of the present invention to monitor searching activity to organize articles in accordance with the searching activity of one or more users.

To accomplish these and other objects, the present invention generally comprises a method of organizing information in which the search activity of a user is monitored and such activity is used to organize articles displayed in the search results. The invention operates by assigning scores to key terms and categories for articles. As users enter search queries and select articles, the scores are altered. The scores are then used in subsequent searches to organize the articles that match a search query. The method allows the search activity of a large number of Internet users to organize the information available over the Internet through an evolutionary process.

This brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the method set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other methods and systems for carrying out the objects and purposes of the present invention. It is important, therefore, that the claims be regarded as including such equivalent constructions insofar as they do not depart from the spirit and scope of the present invention.

DESCRIPTION OF THE PREFERRED EMBODIMENTS

The Internet is an extensive network of computer systems which allows a user to connect with various computer servers or systems. The Internet permits users to send and receive data between the computers connected to this network. The data can be read, viewed or listened to on a browser or other software program from over the Internet on a remote user's computer. This data may comprise articles, databases, data collections, web sites, web pages, graphics, encryption, audio, video or any other type of information collectively referred to as articles and designated herein by the generic labels A1, A2, A3, etc.

The present invention maintains an index of key words, terms, data or identifiers in English or other languages, computer code, or encryption which are collectively referred to as key terms and represented herein by the generic labels Alpha, Beta, Gamma, Delta, Epsilon, etc.

The articles are each associated with one or more of these key terms by any conceivable method of association, such as through indexing all words or through meta-tag headers containing key words selected by the author or editor. Further, a key term score is associated with each article for each of the key terms. For example, an initial index setting may look like this:

| Index | | | | |
|---|---|---|---|---|
| Alpha | Beta | Gamma | Delta | Epsilon |
| A1 - 1 | A1 - 1 | A1 - 1 | A2 - 1 | A1 - 1 |
| A2 - 1 | | A3 - 1 | A3 - 1 | A3 - 1 |
| A3 - 1 | | | | |

The invention will accept a search query from a user and a search engine will identify key terms which match the search query. These key terms which match the search query are called matched key terms. The search engine then identifies in any conceivable manner the articles which are associated with the matched key terms. This can be done by comparing all or part of the search query, or terms equivalent to those in the search query with the key terms in the index to identify the key terms which match the search query. The search engine may account for Boolean logic operators in the search query.

In the example above, a search query of "Alpha AND Gamma" would identify articles A1 and A3 because they are both associated with the matched key terms Alpha and Gamma. Because articles A1 and A3 are associated with the matched key terms, these articles are called matched articles.

The search engine will then display a squib of each of the matched articles. The squib may comprise any portion, hypertext link to or representation of the matched article, such as the title, headings, first few lines of text, audio, video or any other type of information. The user can then scroll through the squibs of the articles and select a desired one of the matched articles by opening, retrieving, reading, viewing, listening to or otherwise closely inspecting the article from over the Internet or from any other storage area. The matched article selected by the user is called the selected matched article.

Once the user has selected a matched article, the index can be altered such that the key term scores for the selected matched article under the matched key terms are altered relative to other key term scores. This indicates that the user believes that the matched key terms for that selected matched article are properly associated with the selected matched article. To alter the key term scores, a positive score such as (+1) can be added to the key term scores, for example, although any other possible indication can be used and the key term scores can be altered by any possible type of operation, mathematical or otherwise, to alter the key term scores for the selected matched article under the matched key terms relative to other key term scores.

Thus, after executing the search query "Alpha AND Gamma," the search engine would display the squib of matched articles A1 and A3. If the user selected only article A3, the index could be altered such that the key term scores for the selected matched article A3 under the matched key terms Alpha Gamma are altered relative to the other key term scores. The index would then look like this:

| Index | | | | |
|---|---|---|---|---|
| Alpha | Beta | Gamma | Delta | Epsilon |
| A1 - 1 | A1 - 1 | A1 - 1 | A2 - 1 | A1 - 1 |
| A2 - 1 | | A3 - 2 | A3 - 1 | A3 - 1 |
| A3 - 2 | | | | |

For the next search by either the same or a different user, the invention could then rank the matched articles by using the key term scores. To this end, the key term scores of each matched article under each of the matched key terms of the new search could then be associated in any possible manner to create a comparison score for each matched article. For example, the key term scores could be added, multiplied together or averaged to create the comparison score for that matched article. The matched articles can then be displayed to the user in order of comparison score superiority, such as by displaying the matched article with the highest comparison score first.

For example, the search query "Alpha AND Epsilon" would again identify matched articles A1 and A3. By multiplying the key term scores of each matched article under each matched key term together to get the comparison score, the comparison score for article A1 would equal 1, whereas the comparison score for article A3 would be 2. The invention would then display the matched article A3 to the user in a superior position to matched article A1.

Disparate Search Activity:

To compensate for disparate search activity for certain articles relative to other articles, the invention may include a key term total score for each key term score of each article under each key term. After each search query is entered or after any other event occurs, the index could then be altered such that the key term total score of each matched article under each matched key term is altered relative to other key term total scores. The index could be altered in this manner after each search query is entered or after any other event, such as after the user has selected one or more articles or has read a matched article for a predetermined length of time.

For example, the index could have an initial setting such as is shown here where the key term scores are separated from the key term total scores by a backslash (/) and given an initial value of one.

| Index | | | | |
|---|---|---|---|---|
| Alpha | Beta | Gamma | Delta | Epsilon |
| A1 - 1/1 | A1 - 1/1 | A1 - 1/1 | A2 - 1/1 | A1 - 1/1 |
| A2 - 1/1 | | A3 - 1/1 | A3 - 1/1 | A3 - 1/1 |
| A3 - 1/1 | | | | |

As illustrated above, if the user selected only article A3 after executing the search query "Alpha AND Gamma," the key term score for article A3 under the matched key terms Alpha and Gamma would be altered relative to other key term scores. Further, the key term total scores for both article A1 and article A3 under the matched key terms could also be altered. If the positive score is added to the key term scores for the selected matched article A3 under the matched key terms Alpha and Gamma, and the positive score is added to the key term total scores for the matched articles A1 and A3 (regardless of whether they were selected or not) under the matched key terms, the index would then look like this:

| Index | | | | |
|---|---|---|---|---|
| Alpha | Beta | Gamma | Delta | Epsilon |
| A1 - 1/2 | A1 - 1/1 | A1 - 1/2 | A2 - 1/1 | A1 - 1/1 |
| A2 - 1/1 | | A3 - 2/2 | A3 - 1/1 | A3 - 1/1 |
| A3 - 2/2 | | | | |

For the next search, the invention could then organize or rank the articles by first comparing the key term scores as related to the respective key term total scores for each of the matched articles under each matched key term to create a key term probability score for that matched article under each respective matched key term from the new search. To this end, the key term scores of each matched article under each of the matched key terms could be compared or associated with their respective key term total score in any known manner to create the key term probability scores for that matched article under the respective matched key terms. For example, the key term scores of each matched article under the matched key terms could be divided by their respective key term total score to create the key term probability score of that matched article under that matched key term.

The key term probability scores of each matched article under each of the matched key terms could then be associated in any known manner to create the comparison score for each matched article identified in the search. For example, the key term probability scores could be added, multiplied or averaged together to create the comparison score for that matched article. The articles can then be displayed to the user in order of superiority, such as by displaying the article with the highest comparison score first.

For example, the new and different search query "Alpha AND Epsilon" would again identify matched articles A1 and A3. The key term probability score for matched article A1 under the key term Alpha would equal the key term score of 1 divided by the key term total score of 2, for a key term probability score of 0.5. Similarly, the key term probability score for matched article A2 under the key term Alpha would equal the key term score of 2 divided by the key term total score of 2, for a key term probability score of 1. Under the key term Epsilon, the key term probability score for matched article A1 would be 1, and the key term probability score for matched article A3 would also be 1, as neither of these scores has been altered from the initial setting in this example.

By multiplying the key term probability scores of each matched article under each matched key term together to get the comparison score, for example, the comparison score for article A1 would equal 0.5, whereas the comparison score for article A3 would be 1. The invention could then display the article A3 to the user in a superior position to article A1 because the comparison score for matched article A3 is higher.

Increased Resolution:

To provide for increased resolution in search ranking, the index may include matching associations of two or more key terms. For example, in the index illustrated below, each key term is grouped with one or more other key terms in a matrix format. Single key terms can be represented by a grouping of identical terms. Using the same initial settings from above, articles are listed in the boxes formed at the intersection of the rows and columns of the matrix to indicate that such articles are associated with the intersecting key terms. Although the index is shown in pair groupings, the index can be extended to include triplicate or other associations as well, i.e. separate boxes for Alpha-Beta-Gamma combinations, etc.

The index shown below has empty boxes because some intersecting groupings are substantially equivalent to other intersecting groupings. As such, one of these intersecting groupings, i.e. Alpha-Beta or Beta-Alpha, can be left blank. Alternatively, the equivalent groupings could be used to record and distinguish between the order of key terms in a search query. In other words, a search query of "Alpha AND Beta" could include the grouping Alpha-Beta, whereas the search query "Beta AND Alpha" would include the grouping Beta-Alpha. In such case, the empty boxes in the matrix would be used.

In the example above, article A1 is the only article which is associated with both the key terms Alpha and Beta. Accordingly, article A1 can be listed in at least the Alpha-Alpha box, in the Alpha-Beta box, and in the Beta-Beta box, for example. Doing this for all key term groupings of the articles in the example above would give an initial index that looked like this:

|  | Index | | | | |
|---|---|---|---|---|---|
|  | Alpha | Beta | Gamma | Delta | Epsilon |
| Alpha | A1 - 1/1<br>A2 - 1/1<br>A3 - 1/1 | A1 - 1/1 | A1 - 1/1<br>A3 - 1/1 | A2 - 1/1<br>A3 - 1/1 | A1 - 1/1<br>A3 - 1/1 |
| Beta |  | A1 - 1/1 | A1 - 1/1 |  | A1 - 1/1 |
| Gamma |  |  | A1 - 1/1<br>A3 - 1/1 | A3 - 1/1 | A1 - 1/1<br>A3 - 1/1 |
| Delta |  |  |  | A2 - 1/1<br>A3 - 1/1 | A3 - 1/1 |
| Epsilon |  |  |  |  | A1 - 1/1<br>A3 - 1/1 |

During a search, an entered search query would typically include one or more key terms. The search engine could separate these key terms into one or more groupings. For example, the search query "Alpha AND Beta" could have only the one grouping Alpha-Beta, or could be separated into three groupings: Alpha-Alpha, Beta-Beta, and Alpha-Beta.

For larger queries, the search query "Alpha AND Beta AND Gamma" could have three groupings: Alpha-Beta, Beta-Gamma, and Alpha-Gamma, but could additionally include the single groupings Alpha-Alpha, Beta-Beta, and Gamma-Gamma. As an additional example, a more complex query such as "Alpha AND (Beta OR Gamma)" could have the groupings Alpha-Beta and Alpha-Gamma, and could additionally include the single groupings Alpha-Alpha, Beta-Beta, and Gamma-Gamma.

As described above, the invention will then accept a search query from a user and a search engine will identify articles which are indexed with the key terms that match the search query. A search query of "Alpha AND Gamma" would identify matched articles A1 and A3 because they are both indexed with the key term groupings Alpha-Alpha, Gamma-Gamma, and Alpha-Gamma. The key term groupings which match the search query are called matched key term groupings. The search engine will then display a squib of each of the matched articles. The user can then scroll through the squibs of the articles and select a desired one of the matched articles.

Once the user has selected a matched article, the key term scores for the selected matched article under the matched key term groupings can be altered to indicate that the user believes that those matched key term groupings are properly associated with the selected matched article. To alter the key term scores, for example, the positive score can be added to the key term scores, although any other possible type of indication can be used.

If the user selected only article A3, the key term scores for selected matched article A3 under the matched key term groupings Alpha-Gamma would be altered. Additionally, the key term scores for selected matched article A3 under the matched key term groupings Alpha-Alpha and Gamma-Gamma could also be altered since the key terms Alpha and Gamma are each represented individually in the results of the search query.

If the key term total score is also used for each key term score of each article and is altered every time a search query matches that key term grouping of that matched article, the index would then look like this:

|  | Index | | | | |
|---|---|---|---|---|---|
|  | Alpha | Beta | Gamma | Delta | Epsilon |
| Alpha | A1 - 1/2<br>A2 - 1/1<br>A3 - 2/2 | A1 - 1/1 | A1 - 1/2<br>A3 - 2/2 | A2 - 1/1<br>A3 - 1/1 | A1 - 1/1<br>A3 - 1/1 |
| Beta |  | A1 - 1/1 | A1 - 1/1 |  | A1 - 1/1 |
| Gamma |  |  | A1 - 1/2<br>A3 - 2/2 | A3 - 1/1 | A1 - 1/1<br>A3 - 1/1 |
| Delta |  |  |  | A2 - 1/1<br>A3 - 1/1 | A3 - 1/1 |
| Epsilon |  |  |  |  | A1 - 1/1<br>A3 - 1/1 |

As explained above, the invention could then organize the articles by first comparing the key term scores as related to the key term total scores for each of the matched articles under each matched key term grouping. To this end, the key term scores of each matched article under each of the matched key term groupings could then be compared or associated with the respective key term total score in any known manner to create the key term probability score for that matched article under each matched key term grouping. For example, the key term scores of each matched article under the matched key term groupings could be divided by the respective key term total score to create the key term probability score for that matched article under those respective key term groupings.

The key term probability scores of each matched article under each of the matched key term groupings could then be associated in any known manner to create the comparison score for each matched article. For example, the key term probability scores could be multiplied together to create the comparison score for that matched article for the search query. The matched articles can then be displayed to the user in order of superiority, such as by displaying the matched article with the highest comparison score first.

For example, a new user entering the search query "Alpha AND Gamma" would result in the search engine again identifying matched articles A1 and A3. Under the key term grouping Alpha-Alpha, the key term probability score for matched article A1 would equal the key term score of 1 divided by the key term total score of 2, for a key term probability score of 0.5. Also, the key term probability score for selected matched article A2 under the key term grouping Alpha-Alpha would equal the key term score of 2 divided by the key term total score of 2, for a key term probability score of 1.

Similarly, under the key term grouping Gamma-Gamma, the key term probability score for matched article A1 would be 0.5, and the key term probability score for selected matched article A3 would equal 1. Under the key term grouping Alpha-Gamma, the key term probability score for the matched article A1 would equal 0.5, and the key term probability score for selected matched article A3 would equal 1.

By multiplying the key term probability scores for each key term of each matched article together to get the comparison score, for example, the comparison score for article A1 would equal 0.5 times 0.5 times 0.5, for a total of 0.125. The comparison score for article A3, on the other hand, would equal 1 times 1 times 1, for a total of 1. The invention could then display the article A3 to the user in a superior position to article A1 because the comparison score for matched article A3 is higher.

Categories:

The invention can also be used to organize articles by category. To this end, the key terms of the index may simply comprise category key terms represented by the generic labels CAT1, CAT2, CAT3, CAT4, etc. The articles can each be associated with one or more of these category key terms, and the key term score is associated with each article for each of the category key terms. Additionally, the index may also include the key term total score for each category key term score of each article, as described above for the key terms.

For example, an initial index setting may look like this:

| Index | | | | |
|---|---|---|---|---|
| CAT1 | CAT2 | CAT3 | CAT4 | CAT5 |
| A1 - 1/1 | A1 - 1/1 | A1 - 1/1 | A2 - 1/1 | A1 - 1/1 |
| A2 - 1/1 | | A3 - 1/1 | A3 - 1/1 | A3 - 1/1 |
| A3 - 1/1 | | | | |

This embodiment of the invention, operating separately from or in addition to the embodiments described above, would permit the user to enter or select a category key term for inclusion in the search query. In this embodiment, the invention would operate in a similar manner for the category key terms as described above for the key terms alone. The invention may allow a user to enter one or more category key terms in formulating a search. For example, the user may enter the category key terms "Apartments" and "Los Angeles" or the category key terms "Romantic" and "Comedy" to find articles (i.e. advertisements or movies) which fall under two or more category key terms.

Moreover, the category key terms can be incorporated into the index of key terms as just another key term and included in the association of the comparison score and, if used, the key term probability scores. The category key terms can have a similar weight as other key terms or may be increasingly or decreasingly weighted to represent relative importance of the categories to the search query. An example of such an index wherein all articles are initially equally ranked in all categories and under all key terms is shown below.

This embodiment of the invention works in a substantially similar manner as the key term groupings described above, except that the key term groupings may also include a category key term. For example, the search query "CAT1 AND Beta" could include just the one grouping CAT1-Beta, or could be separated into three groupings: CAT1-CAT1, Beta-Beta, and CAT1-Beta.

In yet another embodiment of the invention, the category key terms can be incorporated into one side of the index of key terms and associated with the key terms in the index to form the key term groupings. In this embodiment, the category key terms each function as just another key term to form the key term groupings and are included in the association of the comparison score and, if used, the key term probability scores. The category key terms can have a similar weight as other key terms or may be increasingly or decreasingly weighted to represent relative importance of the categories to the search query. An example of such an index wherein all articles are initially equally ranked in all categories is shown below.

| | Index | | | | |
|---|---|---|---|---|---|
| | Alpha | Beta | Gamma | Delta | Epsilon |
| CAT1 | A1 - 1/1 | A1 - 1/1 | A1 - 1/1 | A2 - 1/1 | A1 - 1/1 |
| | A2 - 1/1 | | A3 - 1/1 | A3 - 1/1 | A3 - 1/1 |
| | A3 - 1/1 | | | | |
| CAT2 | A1 - 1/1 | A1 - 1/1 | A1 - 1/1 | A2 - 1/1 | A1 - 1/1 |
| | A2 - 1/1 | | A3 - 1/1 | A3 - 1/1 | A3 - 1/1 |
| | A3 - 1/1 | | | | |
| CAT3 | A1 - 1/1 | A1 - 1/1 | A1 - 1/1 | A2 - 1/1 | A1 - 1/1 |
| | A2 - 1/1 | | A3 - 1/1 | A3 - 1/1 | A3 - 1/1 |
| | A3 - 1/1 | | | | |

This variation also works in a substantially similar manner as the key term groupings described above, with the key term groupings each including a category key term associated with a key term. For example, a key term grouping for the search query "CAT1 AND Beta" would have just the one grouping CAT1-Beta, and the key term grouping for the search query "CAT1 AND Alpha AND Beta" would have the two key term groupings CAT1-Alpha and CAT1-Beta.

Ratings:

The invention can also be used to organize articles by ratings. To this end, the key terms of the index may

| | Index | | | | | | | |
|---|---|---|---|---|---|---|---|---|
| | Alpha | Beta | Gamma | Delta | Epsilon | CAT1 | CAT2 | CAT3 |
| Alpha | A1-1/1 | A1-1/1 | A1-1/1 | A2-1/1 | A1-1/1 | A1-1/1 | A1-1/1 | A1-1/1 |
| | A2-1/1 | | A3-1/1 | A3-1/1 | A3-1/1 | A2-1/1 | A2-1/1 | A2-1-1 |
| | A3-1/1 | | | | | A3-1/1 | A3-1/1 | A3-1/1 |
| Beta | | A1-1/1 | A1-1/1 | | A1-1/1 | A1-1/1 | A1-1/1 | A1-1/1 |
| Gamma | | | A1-1/1 | A3-1/1 | A1-1/1 | A1-1/1 | A1-1/1 | A1-1/1 |
| | | | A3-1/1 | | A3-1/1 | A3-1/1 | A3-1/1 | A3-1/1 |
| Delta | | | | A2-1/1 | A3-1/1 | A2-1/1 | A2-1/1 | A2-1/1 |
| | | | | A3-1/1 | | A3-1/1 | A3-1/1 | A3-1/1 |
| Epsilon | | | | | A1-1/1 | A1-1/1 | A1-1/1 | A1-1/1 |
| | | | | | A3-1/1 | A3-1/1 | A3-1/1 | A3-1/1 |
| CAT1 | | | | | | A1-1/1 | A1-1/1 | A1-1/1 |
| | | | | | | A2-1/1 | A2-1/1 | A2-1/1 |
| | | | | | | A3-1/1 | A3-1/1 | A3-1/1 |
| CAT2 | | | | | | | A1-1/1 | A1-1/1 |
| | | | | | | | A2-1/1 | A2-1/1 |
| | | | | | | | A3-1/1 | A3-1/1 |
| CAT3 | | | | | | | | A1-1/1 |
| | | | | | | | | A2-1/1 |
| | | | | | | | | A3-1/1 | additionally or alternatively comprise rating key terms represented by the generic labels G-Rated and X-Rated, for example. The rating key term G-Rated is considered appropriate for all ages, while the rating key term X-Rated is considered appropriate only for adults.

The articles are each initially associated with one or more of these rating key terms by any possible manner such as by human judgment or default association. The key term score is associated with each article for each of the rating key terms. Additionally, the index may also include the key term total score for each rating key term score of each article, as described above for the key terms.

Moreover, the rating key terms can be incorporated into the index of key terms and included in the association of the comparison score and, if used, the key term probability score. The rating key terms can have a similar weight as other key terms or may be increasingly or decreasingly weighted.

For example, an initial index setting may look like this:

| Index | |
|---|---|
| G-Rated | X-Rated |
| A1 - 1/1 | A1 - 1/1 |
| A3 - 1/1 | A2 - 1/1 |
| | A3 - 1/1 |

The invention, operating separately from or in addition to the manner described above, would permit or require the user to enter a rating key term in the search query. The invention would operate in a similar manner for the rating key terms as described above for the key terms alone, whereby the search activity of the user would alter the key term scores and key term total scores for the rating key terms.

For example, if the user selected only article A3 after executing a search query containing the rating key term X-Rated, the key term score for article A3 under the rating key term X-Rated would be altered relative to the other rating key term scores. The key term total score for matched articles A1, A2 and A3 would also be altered. If the positive score is added to the key term scores for the selected matched article A3, and the positive score is added to the key term total score for the matched articles A1, A2 and A3, the index would then look like this:

| Index | |
|---|---|
| G-Rated | X-Rated |
| A1 - 1/1 | A1 - 1/2 |
| A3 - 1/1 | A2 - 1/2 |
| | A3 - 2/2 |

In this manner, people looking for X-Rated material will identify and effectively label that material as X-Rated. Such X-Rated material can then be screened entirely from the rating key term of G-Rated by precluding articles entirely from the search results which have a key term probability score or comparison score for the rating key term X-Rated above a predetermined threshold.

For example, suppose article A3 contained adult content and articles A1 and A2 contained non-adult content which would not be of interest to users searching with the rating key term of X-Rated. After several users have performed searches, the index may look like this:

| Index | |
|---|---|
| G-Rated | X-Rated |
| A1 - 4/4 | A1 - 2/7 |
| A3 - 21/22 | A2 - 2/10 |
| | A3 - 45/45 |

While the article A3 containing adult content was clearly of interest to the G-Rated crowd, it was also clearly of interest to the X-Rated crowd. Accordingly, the invention would screen the article A3 (i.e. prevent the squib from being displayed) from search queries containing the rating key term of G-Rated.

On the other hand, the rating key terms for articles A1 and A2 under the X-Rated key term are low and suggest that these articles A1 and A2 do not contain adult content. Accordingly, these articles could be displayed in response to a search query containing a rating key term of G-Rated.

The rating key term scores could be permanently or temporarily attached to each article (such as incorporated into a meta-tag) so that articles which are downloaded by persons authorized to access X-rated articles cannot be e-mailed to persons not authorized to receive such articles. In other words, the e-mail browser could have software incorporated therein which checks the rating key term score of any attached articles and screens out those articles which have an X-Rated key term score above the predetermined threshold.

Key Term Suggestions:

The present invention may be configured to suggest key terms or category key terms to a particular user based on the key term or category key term combinations or groupings entered by other users in the past. This suggestion of key terms will help to narrow and focus a particular user's search query.

In this embodiment of the invention, the index may additionally include a key term matching score for each key term grouping, generally designated in the matrix below by the letter M. The invention may also include a key term matching total score (in addition to each key term matching score) for each key term grouping. For example, the index could have an initial setting such as is shown here where the key term matching scores are separated from the key term matching total scores by a backslash (/) and given an initial value of zero.

| | | Index | | | | | | | |
|---|---|---|---|---|---|---|---|---|---|
| | | Alpha | Beta | Gamma | Delta | Epsilon | CAT1 | CAT2 | CAT3 |
| Alpha | | M-0/0 | M-0/0 | M-0/0 | M-0/0 | M-0/0 | M-0/0 | M-0/0 | M-0/0 |
| | | A1-1/1 | A1-1/1 | A1-1/1 | A2-1/1 | A1-1/1 | A1-1/1 | A1-1/1 | A1-1/1 |
| | | A2-1/1 | | A3-1/1 | A3-1/1 | A3-1/1 | A2-1/1 | A2-1/1 | A2-1/1 |
| | | A3-1/1 | | | | | A3-1/1 | A3-1/1 | A3-1/1 |

-continued

| | Alpha | Beta | Gamma | Delta | Epsilon | CAT1 | CAT2 | CAT3 |
|---|---|---|---|---|---|---|---|---|
| Beta | | | M-0/0<br>A1-1/1 | M-0/0<br>A1-1/1 | | M-0/0<br>A1-1/1 | M-0/0<br>A1-1/1 | M-0/0<br>A1-1/1 | M-0/0<br>A1-1/1 |
| Gamma | | | | M-0/0<br>A1-1/1<br>A3-1/1 | M-0/0<br>A3-1/1 | M-0/0<br>A1-1/1<br>A3-1/1 | M-0/0<br>A1-1/1<br>A3-1/1 | M-0/0<br>A1-1/1<br>A3-1/1 | M-0/0<br>A1-1/1<br>A3-1/1 |
| Delta | | | | | M-0/0<br>A2-1/1<br>A3-1/1 | M-0/0<br>A3-1/1 | M-0/0<br>A2-1/1<br>A3-1/1 | M-0/0<br>A2-1/1<br>A3-1/1 | M-0/0<br>A2-1/1<br>A3-1/1 |
| Epsilon | | | | | | M-0/0<br>A1-1/1<br>A3-1/1 | M-0/0<br>A1-1/1<br>A3-1/1 | M-0/0<br>A1-1/1<br>A3-1/1 | M-0/0<br>A1-1/1<br>A3-1/1 |
| CAT1 | | | | | | | M-0/0<br>A1-1/1<br>A2-1/1<br>A3-1/1 | M-0/0<br>A1-1/1<br>A2-1/1<br>A3-1/1 | M-0/0<br>A1-1/1<br>A2-1/1<br>A3-1/1 |
| CAT2 | | | | | | | | M-0/0<br>A1-1/1<br>A2-1/1<br>A3-1/1 | M-0/0<br>A1-1/1<br>A2-1/1<br>A3-1/1 |
| CAT3 | | | | | | | | | M-0/0<br>A1-1/1<br>A2-1/1<br>A3-1/1 |

Figure 1:
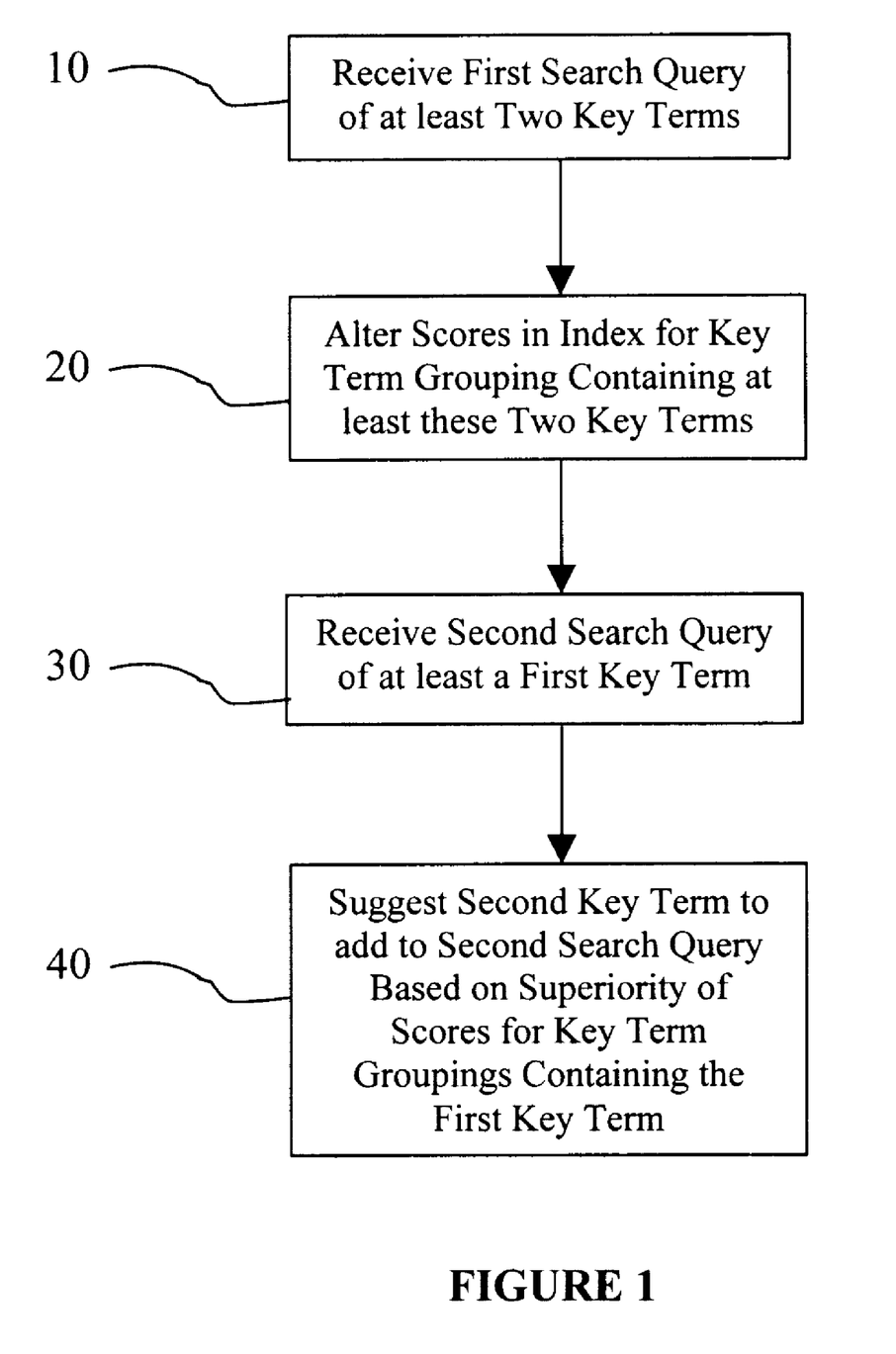
FIG. 1 illustrates in flow diagram form the operational steps taken by the system.

Once a user enters a search query containing two or more key terms, as illustrated at 10 in FIG. 1, or alternatively once a user enters a search query and also selects one of the matched articles, the key term matching score for some, or preferably all, of the key term groupings contained in the search query could be altered relative to other key term matching scores, as illustrated at 20 in FIG. 1. In addition, the key term matching total scores for all key term groupings for each of the key terms in the search query could also be altered relative to other key term matching total scores. The index could be altered in this manner after each search query is entered or after any other event, such as after the user has selected one or more articles or has read a matched article for a predetermined length of time.

For example, a user entering the search query "Alpha AND Gamma" could result in the key term matching score for the key term grouping Alpha-Gamma being altered relative to other key term matching scores in the index, such as by adding the positive score to the key term matching score. In addition, the key term matching total scores for all key term groupings (including groupings comprising category key terms) containing either of the key terms Alpha and Gamma could also be altered relative to other key term matching total scores, such as by also adding the positive score thereto.

If the positive score is added to the key term matching score for the key term grouping Alpha-Gamma, and the positive score is added to the key term matching total scores for all key term groupings containing either of the key terms Alpha and Gamma, as in the above example, the index would then look like this:

| | Alpha | Beta | Gamma | Delta | Epsilon | CAT1 | CAT2 | CAT3 |
|---|---|---|---|---|---|---|---|---|
| Alpha | M-0/1<br>A1-1/1<br>A2-1/1<br>A3-1/1 | M-0/1<br>A1-1/1 | M-1/1<br>A1-1/1<br>A3-1/1 | M-0/1<br>A2-1/1<br>A3-1/1 | M-0/1<br>A1-1/1<br>A3-1/1 | M-0/1<br>A1-1/1<br>A2-1/1<br>A3-1/1 | M-0/1<br>A1-1/1<br>A2-1/1<br>A3-1/1 | M-0/1<br>A1-1/1<br>A2-1/1<br>A3-1/1 |
| Beta | | | M-0/0<br>A1-1/1 | M-0/1<br>A1-1/1 | | M-0/0<br>A1-1/1 | M-0/0<br>A1-1/1 | M-0/0<br>A1-1/1 |
| Gamma | | | | M-0/1<br>A1-1/1<br>A3-1/1 | M-0/1<br>A3-1/1 | M-0/1<br>A1-1/1<br>A3-1/1 | M-0/1<br>A1-1/1<br>A3-1/1 | M-0/1<br>A1-1/1<br>A3-1/1 | M-0/1<br>A1-1/1<br>A3-1/1 |
| Delta | | | | | M-0/0<br>A2-1/1<br>A3-1/1 | M-0/0<br>A3-1/1 | M-0/0<br>A2-1/1<br>A3-1/1 | M-0/0<br>A2-1/1<br>A3-1/1 | M-0/0<br>A2-1/1<br>A3-1/1 |
| Epsilon | | | | | | M-0/0<br>A1-1/1<br>A3-1/1 | M-0/0<br>A1-1/1<br>A3-1/1 | M-0/0<br>A1-1/1<br>A3-1/1 | |
| CAT1 | | | | | | | M-0/0<br>A1-1/1<br>A2-1/1<br>A3-1/1 | M-0/0<br>A1-1/1<br>A2-1/1<br>A3-1/1 | M-0/0<br>A1-1/1<br>A2-1/1<br>A3-1/1 |
| CAT2 | | | | | | | | M-0/0<br>A1-1/1<br>A2-1/1<br>A3-1/1 | M-0/0<br>A1-1/1<br>A2-1/1<br>A3-1/1 |

-continued

| | Index | | | | | | |
|---|---|---|---|---|---|---|---|
| | Alpha | Beta | Gamma | Delta | Epsilon | CAT1 | CAT2 | CAT3 |
| CAT3 | | | | | | | | M-0/0 |
| | | | | | | | | A1-1/1 |
| | | | | | | | | A2-1/1 |
| | | | | | | | | A3-1/1 |

For the next search by either the same or a different user, as shown at 30 in FIG. 1, the invention could then suggest a key term for addition to the search query. The invention could suggest another key term for addition to the search query by looking only to the key term matching scores for key term groupings containing one of the key terms of the search query, as illustrated at 40 in FIG. 1, in which case the key term matching total scores are not needed or used. For example, the key term grouping (or a key term thereof) which has the highest key term matching score could be suggested in response to a search query. In the example above, a user entering the search query "Gamma" could be prompted to add "Alpha" to the search query because it has the highest key term matching score of 1. Additional key terms could also be suggested, preferably in order of the superiority of key term matching scores of those groupings which include the key term(s) or which are related to the key term(s) of the search query. By related is meant a key term or terms which are synonymous, loose equivalents, or otherwise useful substitutes or additions to the key term(s) of the search query. For example, the words "auto" and "car," as well as the words "junk" and "high-yield" can be considered useful substitutes or loose equivalents and thus are considered related.

Another method of this embodiment suggests other key terms for addition to the search query by first comparing the key term matching scores as related to their respective key term matching total scores for each of key term groupings to create a key term matching probability score for each respective key term grouping. To this end, the key term matching score of each key term grouping could be compared or associated with its respective key term matching total score in any known manner to create the key term matching probability scores for the respective key term groupings. For example, the key term matching score of each key term grouping could be divided by its respective key term matching total score to create the key term matching probability score for that key term grouping. The invention could then suggest key terms to the user which form a part of the key term groupings which include one of the key terms from the search query based on the superiority of the key term matching probability scores.

For example, if another user entered the search query "Alpha," the invention could compute and compare all the of the key term matching probability scores for all of the key term groupings which include the key term Alpha. Those key terms forming a part of the one or more key term groupings having the highest key term matching probability scores could then be presented (i.e. displayed) to the user for combination with (i.e. addition to) the search query. The user could then be allowed to select one or more of these suggested key terms, the suggested key term or terms selected by the user could be combined with the search query (i.e. with the Boolean operators "AND" or "OR" or "NOT") and the search query could be run again to generate a new group of matched articles.

In this embodiment, the key term matching total scores are shown as being associated with a particular key term grouping. Alternatively, a key term matching total score could be recorded only in association with each key term. The key term matching total scores for each key term in a particular key term grouping could then be combined in any manner, i.e. averaged, added or otherwise combined, to create the key term matching total score for that particular key term grouping and used in computing the key term matching probability score as described above.

This embodiment of the method may also distinguish between Boolean or other operators connecting key terms together in a search query. This would allow the method to suggest key terms for combination with the search query with a particular Boolean or other operator. One non-exclusive way to accomplish this is for the method to include a separate index for key terms which were connected together with certain Boolean or other operators. For example, the method may contain one index for recording associations between key terms which were connected together with the "AND" operator, and another index for recording index for recording associations between key terms which were connected together with the "OR" operator. The method could then suggest key terms for addition to the search query with the respective operator. Another method of doing this would be to simply record associations between the key term(s) or key term groupings in the index and the respective operators. The operator in a search query entered by a user may be a default or may be inferred, i.e. the search query "Alpha Gamma" may have a default operator of "AND" or such operator may be inferred from the query.

For entered search queries that have more than one key term, such as the search query "Alpha AND Beta," the invention can associate in any known manner (i.e. average) the key term probability scores (or just the key term matching scores) for the key term groupings that separately include either Alpha or Beta and other key terms to determine which of these key terms should be suggested for the entered search query. In other words, the search query could be broken up into its components "Alpha" and "Beta." Using the method as detailed above for a search query containing just a single key term, the invention could separately determine suggested key terms for each of the key terms "Alpha" and "Beta" separately. This would create a first suggested key term or terms for the first key term of the search query "Alpha" and a second suggested key term or terms for the second key term of the search query "Beta."

The key term matching probability score for the key term grouping containing both the first suggested key term and the first key term of the search query could then be associated in any known manner (i.e. averaged or multiplied) with the key term matching probability score for the key term grouping containing both the first suggested key term and the second key term of the search query to obtain a search query matching probability score for the first suggested key term (or, put another way, of the key term grouping containing the first suggested key term).

Similarly, the key term matching probability score for the key term grouping containing both the second suggested key term and the second key term of the search query could then be associated in any known manner (i.e. averaged or multiplied) with the key term matching probability score for the key term grouping containing both the second suggested key term and the first key term of the search query to obtain a search query matching probability score for the second suggested key term.

The invention could then actually present to the user either the first or the second suggested key term to the user for combination with the original search query based on the superiority of their respective search query matching probability scores, i.e. the suggested key term having the highest search query matching probability score (or search query matching score) could be presented first (along with a Boolean or other operator, if so included). If desired, the method may also associate just the key term matching scores in a similar manner to create a search query matching score, in which case the key term matching scores are not needed or used.

For example, if after receiving and recording four (4) instances of the search query "Alpha AND Beta AND Delta," and five (5) instances of the search query "Beta AND Gamma," the index might look like this:

|  | Index | | | | |
|---|---|---|---|---|---|
|  | Alpha | Beta | Gamma | Delta | Epsilon |
| Alpha | M - 0/4 | M - 4/9 | M - 0/9 | M - 4/4 | M - 0/4 |
| Beta |  | M - 0/9 | M - 5/9 | M - 4/9 | M - 0/9 |
| Gamma |  |  | M - 0/5 | M - 0/9 | M - 0/5 |
| Delta |  |  |  | M - 0/4 | M - 0/4 |
| Epsilon |  |  |  |  | M - 0/0 |

If the next-entered search query is "Alpha AND Beta," the invention can determine the first suggested key term from the key term groupings that separately include the key term "Alpha" and the second suggested key term from the key term groupings that separately include the key term "Beta." In this example, the first suggested key term would be "Delta" because it has a key term matching probability score of 4/4 and the second suggested key term would be "Gamma" because it has a key term matching probability score of 5/9.

The key term matching probability score of 4/4 for the key term grouping containing both the first suggested key term ("Delta") and the first key term of the search query ("Alpha") could then be associated in any known manner (i.e. averaged, multiplied, etc.) with the key term matching probability score of 4/9 for the key term grouping containing both the first suggested key term ("Delta") and the second key term of the search query ("Beta") to obtain a search query matching probability score of 7/9 (i.e. by averaging 4/4 and 4/9) for the first suggested key term ("Delta").

Similarly, the key term matching probability score of 5/9 for the key term grouping containing both the second suggested key term ("Gamma") and the second key term of the search query ("Beta") could then be associated in any known manner (i.e. averaged, multiplied, etc.) with the key term matching probability score of 0/9 for the key term grouping containing both the second suggested key term ("Gamma") and the first key term of the search query ("Alpha") to obtain a search query matching probability score of 5/18 (i.e. by averaging 5/9 and 0/9) for the second suggested key term ("Gamma").

The invention would then present to the user the first suggested key term ("Delta") for combination with the original search query based on the superiority of its search query matching probability score because the search query matching probability score of 7/9 for the first suggested key term is greater than the search query matching probability score of 5/18 for the second suggested key term.

This method utilizing the search query matching probability scores can, of course, be used for search queries using any number of key terms simply by comparing the strength of the association (i.e. matching probability scores) of the suggested key terms for each individual key term with the other key terms in the search query to determine a search query matching probability score for the suggested key terms and then presenting the suggested key terms in accordance with the superiority of their respective search query matching probability scores to the user for combination with the search query. This embodiment can also be configured as described above to accommodate various Boolean or other operators.

This embodiment of the invention has the additional benefit of allowing a subsequent user to learn from the collective knowledge and actions of previous users as to what key terms should be added to narrow or broaden the search query based on the key terms or key term groupings initially selected by such subsequent user.

Implementation:

The present invention is intended to operate in any form of networked or stand alone computer or computer system. For instance, the program can be run on a server connected to the Internet. A user having a remote computer connected to the Internet can access the program over the Internet via a browser or other program and enter a search query from the remote site. The program on the server can generate a list of matched articles, by any method such as described herein, and transmit a list of squibs, such as hypertext links or other article identifiers to the remote computer for display on the screen. The user can then select one of the articles by "clicking" on the squib or other identifier, for example. By clicking is generally meant any electronic selection of the article and is specifically meant the positioning of an electronic pointer on the squib of the article displayed on the screen via a mouse or other pointing device and operating the button or switch of the mouse one or more times to direct a browser to access the article or any other portion thereof.

If the squib is a hypertext link, then the browser of the remote computer will retrieve the data of the article from the server URL indicated by the hypertext link. Before or after accessing the article URL through the hypertext link, the remote computer can send a data packet to the search server to indicate which matched article the user selected. As a user selects an article, the invention can send a message to the search server or other location to indicate the selected article either before or after the article is retrieved, opened, listened or otherwise viewed by the user for any amount of time, or after a pre-determined amount of time. For example, the remote computer could send a message to the search server after the remote user has selected a matched article and had the article open for more than a predetermined length of time. This would indicate that the article was what the user was searching for and indicate a stronger correlation between the search query and the selected matched article. The user could also be prompted to positively indicate selection by scoring, ranking, agreeing with the selection or otherwise positively indicating selection of the article.

The invention may be incorporated into a client-side or server-side software interface which accepts or otherwise records a search query which is forwarded or input directly to another search engine available over the Internet. That search engine can then generate a list of matched articles which is then forwarded to the software interface wherein the organization method described herein is utilized to rank the articles. Alternatively, the invention can be simply incorporated into the search engine as a single server-side or client-side software program.

In this connection, the invention may initially or continuously utilize the ranking of the articles provide by a search engine. Specifically, the index of the invention may be initially empty or set to a neutral setting and subsequently populated through repeated uses of the invention, whereby the invention "learns" from each user. Each subsequent user would thus benefit from the prior human judgements about which key terms or groupings are relevant to which articles. In this case, the organization or ranking provided by the search engine could initially be used in displaying the articles. Then, after a predetermined event or amount of time occurs, only the index of the invention could be used to organize the articles, if desired.

Alternatively, the comparison scores could be continuously combined with the ranking provided by the search engine to supplement or correct such a ranking. For example, the search engine may rank or organize the articles by providing a relevancy score, such as the percentile relevancy provided by the search engines "Excite" (TM) or "Lycos" (TM). This percentile could be associated (such as by averaging or multiplying) with the comparison score generated by the invention to create another comparison score that is then used to rank or organize the articles. For search engines that do not provide a percentile relevancy score, a percentile relevancy can be assigned to the articles in accordance with their order or position in the list generated by the search engine.

The index of the present invention may comprise a database, spreadsheet or any other means of storing (temporarily or otherwise) the scores or other information about the key terms and articles. The present invention may also be incorporated in a search engine, browser, or other data managing program. The scores or other information may also be integrated or otherwise associated with any index of key terms used by any search engine, browser, or other data managing program.

The index may include key terms, category key terms and ratings key terms. A search query may comprise one or more key terms coupled with a category key term and/or a rating key term. For example, a user could first select one or more category key terms. The category key terms can be selected through a hierarchical structure of key terms, i.e. Real Estate; Rental; Apartments; Los Angeles. The user can then enter or add onto the category key term a search query of one or more key terms such as words. The total search query could then include the category key terms and the words as key terms. If desired, a rating key term could also be added to the search query. This search query would then be processed as described above.

To further broaden the utility of the invention, a search query could be separated not only into its component key terms, but also into key terms or key term groupings that include synonyms or otherwise analogous or equivalent key terms. For example, the search query "Car and Chevrolet" could include the following key terms: Car, Automobile, Vehicle, Chevrolet, Chevy. If separated into key term groupings, there could be the key term groupings, Car-Chevrolet, Car-Chevy, Automobile-Chevrolet, Automobile-Chevy, Vehicle-Chevrolet and Vehicle-Chevy. These key terms or key term groupings could then all be altered as described above as the user selects and ignores certain of the matched articles. This use of similar key terms would broadened the use of the invention because a subsequent user who types in the search query "Automobile and Chevy" would benefit from the search activity of a previous user who typed in the search query "Car and Chevrolet" and selected certain articles from a list of hits.

Initially, the key terms, category key terms and rating key terms may be associated with words or other information in the article, or may be arbitrarily associated with the article in any manner. For example, the associations may be created by an indexing software robot which indexes all words in the article as key terms, meta tags specified by the author, reviewer or editor, or by any other means known or later developed for associating certain key terms with each article.

Although the scores in the index are initially shown at 1, they can be initially set to any desired score. For example, the scores can be initially set to correspond with the frequency of the term occurrence in the article. Alternatively, a human editor could assign scores according to judgments made by such editor.

The key term probability score can be created by any possible association between one or more of the key term scores and one or more of the key term total scores for the matched article under one or more of the matched key terms. Similarly, the comparison score can be created by any possible association between one or more of the key term scores and/or one or more of the key term total scores and/or one or more of the key term probability scores for the matched article under one or more of the matched key terms.

The squib may comprise any portion or representation of the matched article, such as the title, headings, first few lines of text, audio, video or any other type of information.

When a search identifies more matched articles than can be displayed on the user's computer screen, the altering of the index may affect only those articles which the user has had a chance to view the squib of and either select or not select. For example, suppose over 1000 matched articles are identified, and the user views only the squibs of the first 20 articles and selects one of these articles. The matched articles having squibs displayed on screen are called displayed matched articles. The index can be altered so as to alter the key term total scores of only the displayed matched articles under the matched key terms. In this manner, the scores of matched articles which are not seen by the user are not altered relative to other scores.

Although the index has been shown as listing the key terms and positioning the articles "under" the key terms, the index may be configured in any desired manner which allows the articles and scores to be associated with the key terms in any manner. For example, the index may be configured such that the key terms are positioned "under" the articles. An example of such an index is shown below.

| | | Index | | |
|---|---|---|---|---|
| A1 | A2 | A3 | A4 | A5 |
| Alpha - 1/1 | Alpha - 1/1 | Alpha - 1/1 | Beta - 1/1 | Alpha - 1/1 |
| Beta - 1/1 | | Gamma - 1/1 | Gamma - 1/1 | Gamma - 1/1 |
| Gamma - 1/1 | | | | |

Although the specification describes altering the index by adding the positive score, other permutations are possible. For example, if the user does not select the matched article, the key term score for that matched article under that key term can be assigned a negative score. The negative score can be (−1), for example. The negative score implies that the user believes that the article should not be associated with that key term. This is because the user has performed a search with a search query containing that matched key term and has not selected that matched article from that search. Further, if the article is not displayed on the screen because the user does not scroll down to display that article, the key term score for that matched article under that matched key term can be assigned a neutral score. The neutral score can be (0), for example. The neutral score implies that the user neither believes nor disbelieves that the article should be associated with that matched key term.

Another method of altering the index may comprise altering the key term scores and/or key term total scores by a first positive score for certain actions, such as simply opening the article for viewing or listening, and altering the key term scores and/or key term total scores by a second positive score for certain actions such as downloading, reading the entire article or reading the article for a predetermined length of time (i.e. determined as having the article open for a predetermined length of time while scrolling through the article on the screen). Preferably, the second positive score is greater than the first positive score such that certain actions by the user which are more likely to indicate the relevance of the article to the key words of the search query affect the index greater than certain actions which may be considered "noise" in the searcher's activity, i.e. such as what occurs when a user begins "surfing the net" aimlessly during a search query.

The definitions used herein are not meant to be limiting. For example, by altering is meant any action which changes the score or scores of the selected matched article relative to the scores of the unselected matched articles. By score is meant marking, indicia, indicator, data element, or other identifier, whether in computer code, a readable language, encryption, or any other method of data, all of which are collectively referred to as score. The names positive, negative and neutral as used in the scores do not necessarily refer to positive or negative numbers, but instead refer to whether an article has received a positive vote, a negative vote, or a neutral vote.

In yet another alternative embodiment, the search activity of a user can be stored in the form of what are commonly known in the computer industry as "cookies." For example, the key terms and/or key term groupings and scores for certain articles as a result of the search activity of the user could be stored as one or more cookies. These cookies could then be periodically downloaded to a central location for inclusion in the index, whereby the data from the cookies would be used to alter the index as described herein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in form, function and manner of operation, implementation and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for organizing information comprising:
    (a) providing an index, the index being able to store key terms and associate each key term with at least one other key term to form key term groupings, the index further being able to associate a key term matching score with each key term grouping;
    (b) accepting a first search query containing at least two key terms from a first user, with key terms of the first search query dcefining at least one key term grouping that contains at least two of the key terms of the first search query; storing the at least one key term grouping within the index; and storing a key term matching score with the at least one key term grouping;
    (c) altering the index such that the key term matching score for the key term grouping that contains at least two of the key terms of the first search query is altered relative to other key term matching scores;
    (d) accepting a second search query containing at least a first key term from a second user;
    (e) suggesting at least a second key term to the second user from one of the key term groupings defined by the first user that contains the first key term in accordance with the superiority of the key term matching scores of the key term groupings that contain the first key term.

2. The method for organizing information of claim 1, wherein the index further associates a key term matching total score with each key term grouping; and further wherein step (e) comprises:
    (e2a) comparing the key term matching scores with their respective key term matching total scores for at least some of the key term groupings containing the first key term to create a key term matching probability score for the respective key term groupings;
    (e2b) suggesting at least a second key term to the second user from one of the key term groupings containing the first key term in accordance with the superiority of the key term matching probability scores of the key term groupings that contain the first key term.

3. The method for organizing information of claim 2, wherein step (e2a) comprises:
    (e3a) dividing the key term matching scores by their respective key term matching total scores for at least some of the key term groupings containing the first key term to create a key term matching probability score for the respective key term groupings.

4. The method for organizing information of claim 1, wherein step (b) comprises:
    (b2) accepting a first search query containing at least two key terms from a first user, with key terms of the first search query defining at least one key term grouping that contains at least two of the key terms of the first search query, storing the at least one key term grouping within the index, storing a key term matching score with the at least one key term grouping, and searching for articles related to the first search query.

5. The method for organizing information of claim 1, and further comprising the steps of:
    (f) allowing the second user to select the second key term;
    (g) adding the second key term to the second search query to define a third search query;
    (h) searching for articles related to the third search query.

6. A method for organizing information comprising:
    (a) providing an index of key terms, the index associating each key term with at least one other key term to form key term groupings, the index further associating a key term matching score with each key term grouping;

(b) accepting a first search query containing at least two key terms from a first user, with key terms of the first search query defining at least one key term grouping that contains at least two of the key terms of the first search query; storing the at least one key term grouping within the index; and storing a key term matching score with the at least one key term grouping;

(c) altering the index such that the key term matching score for the key term grouping that contains at least two of the key terms of the first search query is altered relative to other key term matching scores;

(d) accepting a second search query containing a first key term from a second user;

(e) suggesting at least a second key term to the second user from one of the key term groupings defined by the first user that contains the first key term in accordance with the superiority of the key term matching scores of the key term groupings that contain the first key term.

7. The method for organizing information of claim 6, wherein the index further associates a key term matching total score with each key term grouping; and further wherein step (c) comprises:

(c1) altering the index such that the key term matching score for the key term grouping that contains at least two of the key terms of the first search query is altered relative to other key term matching scores; and altering the index such that the key term matching total scores for the key term groupings that contain at least one of the key terms of the first search query are altered relative to other key term matching total scores.

8. The method for organizing information of claim 6, wherein the index further associates a key term matching total score with each key term grouping; and further wherein step (e) comprises:

(e1a) comparing the key term matching scores with their respective key term matching total scores for at least some of the key term groupings containing the first key term to create a key term matching probability score for the respective key term groupings;

(e1b) suggesting at least a second key term to the user from one of the key term groupings containing the first key term in accordance with the superiority of the key term matching probability scores of the key term groupings that contain the first key term.

9. The method for organizing information of claim 8, wherein step (e1a) comprises:

(e2a) dividing the key term matching scores by their respective key term matching total scores for at least some of the key term groupings containing the first key term to create a key term matching probability score for the key term groupings.

10. The method for organizing information of claim 6, wherein step (d) comprises:

(d2) accepting a second search query containing a first key term from a second user, and searching for articles related to the second search query.

11. The method for organizing information of claim 6, and further comprising the steps of:

(f) allowing the second user to select the second key term;

(g) adding the second key term to the second search query to define a third search query;

(h) searching for articles related to the third search query.

12. The method for organizing information of claim 6, wherein step (b) comprises:

(b1) accepting a first search query containing at least two key terms from a first user; searching for articles related to the first search query; displaying at least a portion of the articles to the first user; and allowing the first user to select one of the articles, with key terms of the first search query defining at least one key term grouping that contains at least two of the key terms of the first search query; storing the at least one key term grouping within the index scores only after the first user has selected one of the articles; and storing a key term matching score with the at least one key term grouping scores only after the first user has selected one of the articles;

and further wherein step (c) comprises:

(c2) altering the index such that the key term matching score for the key term grouping that contains at least two of the key terms of the first search query is altered relative to other key term matching scores only after the first user has selected one of the articles.

13. The method for organizing information of claim 12, wherein the index further associates a key term matching total score with each key term grouping;

and further wherein step (c) comprises:

(c1) altering the index such that the key term matching score for the key term grouping that contains at least two of the key terms of the first search query is altered relative to other key term matching scores; and altering the index such that the key term matching total scores for the key term groupings that contain at least one of the key terms of the first search query are altered relative to other key term matching total scores.

14. The method for organizing information of claim 6, wherein the index associates an operator with each key term grouping;

and further wherein step (b) comprises:

(b2) accepting a first search query containing at least two key terms and an operator from a first user;

and further wherein step (c) comprises:

(c3) altering the index such that the key term matching score for the key term grouping that is associated with the operator of the first search query and that contains at least two of the key terms of the first search query is altered relative to other key term matching scores.

15. A method for organizing information comprising:

(a) accepting a first search query from a first user containing at least first and second key terms;

(b) recording an association between the first and second key terms of the first search query as a result of the first user entering the first and second key terms together in the first search query;

(c) accepting a second search query from a second user containing at least a third key term, the second user being different from the first user;

(d) suggesting to the second user the second key term for combination with the second search query when the third key term is related to the first key term of the first search query.

16. The method for organizing information of claim 15, and further comprising the steps of:

(e) allowing the second user to select the second key term;

(f) adding the second key term to the second search query to define a third search query;

(g) searching for articles related to the third search query.

17. The method for organizing information of claim 15, wherein step(a) comprises:

(a1) accepting a first search query from a first user containing at least first and second key terms; searching for articles related to the first search query; displaying at least a portion of the articles to the first user; and allowing the first user to select one of the articles;

and further wherein step (b) comprises:

(b1) recording an association between the first and second key terms of the first search query as a result of the first user entering the first and second key terms together in the first search query only after the first user has selected one of the articles.

18. The method for organizing information of claim 15, wherein step (a) comprises:

(a2) accepting a first search query containing at least first and second key terms and an operator;

and further wherein step (b) comprises:

(b2) recording an association between the first and second key terms and the operator of the first search query as a result of the first user entering the first and second key terms together in the first search query;

and further wherein step (d) comprises:

(d1) suggesting to the second user the second key term and the operator for combination with the second search query when the third key term is related to the first key term of the first search query.

19. A method for organizing information comprising:

(a) providing an index of key terms, the index associating each key term with at least one other key term to form key term groupings, the index further associating a key term matching score with each key term grouping;

(b) accepting a first search query containing first and second key terms from a user;

(c) determining a first suggested key term from one of the key term groupings containing the first key term in accordance with the superiority of the key term matching scores of the key term groupings that contain the first key term;

(d) determining a second suggested key term from one of the key term groupings containing the second key term in accordance with the superiority of the key term matching scores of the key term groupings that contain the second key term;

(e) associating the key term matching score for the key term grouping containing both the first suggested key term and the first key term of the search query with the key term matching score for the key term grouping containing both the first suggested key term and the second key term of the search query to define a first search query matching score for the key term grouping containing the first suggested key term;

(f) associating the key term matching score for the key term grouping containing both the second suggested key term and the second key term of the search query with the key term matching score for the key term grouping containing both the second suggested key term and the first key term of the search query to define a second search query matching score for the key term grouping containing the second suggested key term;

(g) suggesting one of the suggested key terms to the user for combination with the first search query in accordance with the superiority of their respective search query matching scores.

20. A method for organizing information comprising:

(a) providing an index of key terms, the index associating each key term with at least one other key term to form key term groupings, the index further associating a key term matching score with each key term grouping, wherein the index further associates a key term matching total score with each key term grouping;

(b) accepting a first search query containing at least a first key term from a user;

(c) comparing the key term matching scores with their respective key term matching total scores for at least some of the key term groupings containing the first key term to create a key term matching probability score for the respective key term groupings;

(d) suggesting at least a second key term to the user from one of the key term groupings containing the first key term in accordance with the superiority of the key term matching probability scores of the key term groupings that contain the first key term.

21. The method for organizing information of claim 20, wherein step (c) comprises:

(c1) dividing the key term matching scores by their respective key term matching total scores for at least some of the key term groupings containing the first key term to create a key term matching probability score for the respective key term groupings.

22. The method for organizing information of claim 20, wherein step (b) comprises:

(b1) accepting a first search query containing first and second key terms from a user;

wherein step (d) comprises:

(d1a) determining a first suggested key term from one of the key term groupings containing the first key term in accordance with the superiority of the key term matching probability scores of the key term groupings that contain the first key term;

(d1b) determining a second suggested key term from one of the key term groupings containing the second key term in accordance with the superiority of the key term matching probability scores of the key term groupings that contain the second key term;

(d1c) associating the key term matching probability score for the key term grouping containing both the first suggested key term and the first key term of the search query with the key term matching probability score for the key term grouping containing both the first suggested key term and the second key term of the search query to define a first search query matching probability score for the key term grouping containing the first suggested key term;

(d1d) associating the key term matching probability score for the key term grouping containing both the second suggested key term and the second key term of the search query with the key term matching probability score for the key term grouping containing both the second suggested key term and the first key term of the search query to define a second search query matching probability score for the key term grouping containing the second suggested key term;

(d1e) suggesting one of the suggested key terms to the user for combination with the first search query in accordance with the superiority of their respective search query matching probability scores.

23. A method for organizing information comprising:

(a) providing an index of key terms, the index associating each key term with at least one other key term to form key term groupings, the index further associating a key term matching score with each key term grouping, wherein the index further associates a key term matching total score with each key term grouping;

(b) accepting a first search query containing at least two key terms from a user;

(c) altering the index such that the key term matching score for the key term grouping that contains at least two of the key terms of the first search query is altered relative to other key term matching scores;

(d) altering the index such that the key term matching total scores for the key term groupings that contain at least one of the key terms of the first search query are altered relative to other key term matching total scores.

24. A method for organizing information comprising:

(a) providing an index of key terms, the index associating each key term with at least one other key term to form key term groupings, the index further associating a key term matching score with each key term grouping, wherein the index further associates a key term matching total score with each key term grouping;

(b) accepting a first search query containing at least two key terms from a user;

(c) altering the index such that the key term matching score for the key term grouping that contains at least two of the key terms of the first search query is altered relative to other key term matching scores;

(d) accepting a second search query containing a second key term from a user;

(e) comparing the key term matching scores with their respective key term matching total scores for at least some of the key term groupings containing the second key term to create a key term matching probability score for the respective key term groupings;

(f) suggesting at least a third key term to the user from one of the key term groupings containing the second key term in accordance with the superiority of the key term matching probability scores of the key term groupings that contain the second key term.

25. The method for organizing information of claim 24, wherein step (e) comprises:

(e1) dividing the key term matching scores by their respective key term matching total scores for at least some of the key term groupings containing the second key term to create a key term matching probability score for the key term groupings.

26. A method for organizing information comprising:

(a) providing an index of key terms, the index associating each key term with at least one other key term to form key term groupings, the index further associating a key term matching score with each key term grouping, wherein the index further associates a key term matching total score with each key term grouping;

(b) accepting a first search query containing at least two key terms from a user; searching for articles related to the first search query; displaying at least a portion of the articles to the user; and allowing the user to select one of the articles;

(c) altering the index such that the key term matching score for the key term grouping that contains at least two of the key terms of the first search query is altered relative to other key term matching scores only after the user has selected one of the articles;

(d) altering the index such that the key term matching total scores for the key term groupings that contain at least one of the key terms of the first search query are altered relative to other key term matching total scores.

27. A method for organizing information comprising:

(a) providing an index of key terms, the index associating each key term with at least one other key term to form key term groupings, the index further associating a key term matching score with each key term grouping, wherein the index associates an operator with each key term grouping;

(b) accepting a first search query containing at least two key terms and an operator from a user;

(c) altering the index such that the key term matching score for the key term grouping that is associated with the operator of the search query and that contains at least two of the key terms of the first search query is altered relative to other key term matching scores.

28. A method for organizing information comprising:

(a) accepting a first search query containing at least first and second key terms and an operator;

(b) recording an association between the first and second key terms and the operator of the first search query;

(c) accepting a second search query containing at least a third key term;

(d) suggesting the second key term and the operator for combination with the second search query when the third key term is related to the first key term of the first search query.

* * * * *